United States Patent

Vishin et al.

[11] Patent Number: 5,860,146
[45] Date of Patent: Jan. 12, 1999

[54] AUXILIARY TRANSLATION LOOKASIDE BUFFER FOR ASSISTING IN ACCESSING DATA IN REMOTE ADDRESS SPACES

[75] Inventors: Sanjay Vishin, Sunnyvale; Gunes Aybay, Burlingame, both of Calif.

[73] Assignee: Sun Microsystems, Inc., Palo Alto, Calif.

[21] Appl. No.: 669,979

[22] Filed: Jun. 25, 1996

[51] Int. Cl.$^6$ .................................................. G06F 12/10
[52] U.S. Cl. ........................................... 711/207; 395/823
[58] Field of Search ............................. 711/5, 148, 202, 711/203, 206, 207, 209; 395/823

[56] References Cited

U.S. PATENT DOCUMENTS

| | | | |
|---|---|---|---|
| 4,473,878 | 9/1984 | Zolnowsky et al. ...................... | 711/208 |
| 5,117,350 | 5/1992 | Parrish et al. ................................ | 711/1 |
| 5,230,045 | 7/1993 | Sindhu ....................................... | 711/203 |
| 5,247,629 | 9/1993 | Casamatta et al. ...................... | 711/206 |
| 5,497,480 | 3/1996 | Hayes et al. ............................... | 711/207 |
| 5,649,141 | 7/1997 | Yamazaki .................................. | 711/206 |
| 5,682,512 | 10/1997 | Tetrick ....................................... | 711/202 |
| 5,710,907 | 1/1998 | Hagersten et al. ........................ | 711/148 |

FOREIGN PATENT DOCUMENTS

| | | |
|---|---|---|
| 497 600 | 8/1992 | European Pat. Off. . |
| WO95/16964 | 6/1995 | WIPO . |

OTHER PUBLICATIONS

Patterson et al., "Computer Organization & Design, The Hardware Software Interface," 1994, pp. 491–495.
EPO Search Report, EP97304324, Oct. 15, 1997.

*Primary Examiner*—Tod R. Swann
*Assistant Examiner*—Gary J. Portka
*Attorney, Agent, or Firm*—Gary S. Williams; Flehr Hohbach Test Albritton & Herbert LLP

[57] ABSTRACT

A computer system includes a data processor, a primary translation lookaside buffer for storing page table entries and translating virtual addresses into physical addresses, local memory coupled to the data processor for storing data and computer programs at specified physical addresses, and remotely located memory coupled to the data processor by a computer network for storing data at specified remote physical addresses. The computer system further includes a remote translation lookaside buffer (RTLB) that stores a plurality of remote page table entries. Each remote page table entry represents a mapping between a range of physical addresses and a corresponding range of remote physical addresses. The primary translation lookaside buffer translates a virtual address asserted by the data processor into a physical address. When the physical address does not correspond to a location in the local memory, the RTLB determines whether the physical address matches at least one of the remote page table entries stored in the RTLB, and selects one of those remote page table entries when at least one match is found. The RTLB's selection circuitry selects a single remote page table entry in accordance with predefined RPTE selection criteria when two or more of the remote page table entries match the physical address. Then, a remote physical address is generated by combining a portion of the selected remote page table entry with a portion of the physical address.

12 Claims, 4 Drawing Sheets

AUXILIARY TRANSLATION LOOKASIDE BUFFER FOR ASSISTING IN ACCESSING DATA IN REMOTE ADDRESS SPACES

The present invention relates generally to multiprocessor computer systems having virtual memory management subsystems, and particularly to a memory controller that manages access to remote physical addresses through the use of an auxiliary translation lookaside buffer.

BACKGROUND OF THE INVENTION

Referring to FIG. 1, there is shown a distributed computer system 100 that includes a plurality of processor clusters 102. Each cluster 102 will typically include one to four symmetric processors 104 that are coupled via a common bus 106 to a local memory store 108. One or more of the clusters may also include secondary memory 110 (non-volatile memory such as magnetic disk storage). Access to the local memory store 108 (and secondary memory 110, if present) shared by all the processors in the cluster 102 is governed by a memory controller 112 that also can send requests via a network 114 to pull in pages of data stored in the memory stores or secondary memory of other clusters 102 or other devices coupled to the network 114.

Each processor 104 in a cluster 102 includes its own local cache memory 120 that must be kept coherent (i.e., consistent) with the contents stored in the cache memories of the other processors in the system. Each processor 104 in a cluster 102 also includes a translation lookaside buffer (TLB) 122, the purpose of which will be explained below.

Virtual Memory Management Within a Single Processor Cluster

The following is a very brief explanation of virtual memory management and the role of the TLB in virtual memory management. In this initial explanation, accessing data stored outside the cluster will not be considered.

Referring to FIGS. 2 and 3, application programs typically access data using virtual addresses. For instance, every process running in a computer system may have a virtual address space of 4 Gigabytes, using address values ranging from 0 (zero) to OFF FFF $FFF_{16}$ ($4,284,967,295_{10}$). However, the amount of primary physical memory in the system will generally be much less than N×4 Gigabytes, where N is the number of simultaneously active processes. Rather, each process will generally use only a very small fraction of its full address space during any short period of time, and each "page" of virtual memory address space that is actively being used will be mapped into a page of primary physical memory 108 using a data structure called a page table 130. A "page" is typically sized between 1 K and 16 K bytes, with 4 K bytes being a frequently used page size.

The page table 130, which is divided into pages called page table pages 132, typically contains a distinct entry, called a page table entry (PTE) 134 for each page of virtual memory that has been defined to store data or instructions. The PTE 134 for a particular virtual memory page directly or indirectly includes a tag 136 that identifies the virtual page to which it applies, and a physical memory page address (PPA) 138 that identifies where the corresponding physical memory page is located primary memory 108 or secondary memory 110.

Like a conventional cache memory that stores the data most recently used by a processor, the translation look aside buffer (TLB) 122 stores the PTEs most recently used by the processor. The TLB 122 in each processor not only acts as a cache memory for PTEs, it is also the device that translates virtual addresses into physical addresses. In particular, to translate a virtual memory address into a physical memory address, the high order X-N bits of the address (where X is the number of bits in each address and $2^N$ is the number of bytes in each page) of the virtual address are compared with the tags of the PTE's in the TLB 122. If the high order address bits match the tag of a valid PTE (i.e., a PTE in the TLB 122 whose valid flag 140 is set to "1" or True), then the TLB generates a physical address value (PA) in which the X-N high order bits of the virtual address are replaced with the physical page address (PPA) 138 in the PTE.

If the PTE 134 required to translate a virtual address is not currently located in the TLB 122, a request is sent to the memory controller 112 to locate and send that PTE to the TLB. After the required PTE 134 is stored in the TLB 122 the virtual address to physical address translation process described above is performed by the TLB 122.

If a copy of the data in the resulting primary physical memory address is stored in cache memory 120, then the processor 104 accesses the addressed data directly in its cache memory 120. If the addressed data is not in cache memory 120, the memory controller 112 retrieves the addressed data from primary memory 108 and stores it in the cache memory 120. Then the processor 104 accesses the addressed data from its cache memory 120.

When a process attempts to address data that is not currently stored in primary memory 108, but is stored in the local secondary memory 110, the PTE 134 corresponding to the virtual address specified by the program being executed will have its valid flag 140 set to False, indicating that the PTE cannot map the address to a primary physical memory page, but other flags 142 in the PTE will indicate that the page is stored in local secondary memory 110. When the PTE for translating a virtual address is found to be invalid, this is called a "page fault." In response to the page fault the operating system of the cluster 102 will request the memory controller 112 to retrieve the specified page from secondary memory 110 and store it in a free page in primary memory 108. After the page retrieval is completed, the PTE is updated to indicate the page's new location in primary memory 108 and its valid flag is set to True, and then the application program requiring that data resumes execution using the page of data that has just been swapped in to primary memory.

Extending the Address Space to Memory Outside the Cluster

Referring to FIGS. 1 and 4, many present day server computers are symmetric multiprocessor systems that use a bus based "snoop scheme" to maintain cache coherence. This architecture typically accommodates 4 to 16 processor systems reasonably well. However, for many applications such as database decision support, Web servers, multimedia storage and retrieval servers, online transaction processing, computer clusters, and the like, there is a need to scale to systems having more than 4 to 16 processors. A distributed system 100 having multiple symmetric processor clusters 102 can be used for such applications. There are, in general, two ways of extending the scalability of symmetric processor systems. The first method uses "message passing" to extend scalability, and the second method uses a "shared memory" paradigm. The present invention falls is the latter class.

In the distributed system 100 each cluster 102 is perceived as a single node whose address space is extended to include a global address space. To map sections of the global address space in the physical address space of each cluster, a remote page table 150 (or portions of a remote page table) can be stored in the local memory 108/110 of each cluster 102. The remote page table 150 contains remote page table entries (RPTEs) 152, each of which is used to translate a range of physical addresses into a range of remote physical addresses. From the viewpoint of each cluster, the global address space is considered to be a "remote physical address space".

The size of the address space represented by each RPTE 152 may differ from the size of the address space associated with each PTE 134. Thus, it is possible that one RPTE 152 might be used to map a large address space (e.g., 256 Mbytes) from physical address space to remote physical address space (also sometimes called the global address space).

Translating a physical address to a remote physical address can be slow because of the need to first access the page in primary memory 108 that stores the corresponding RPTE 152 in the remote page table 150, and then translate the address using appropriate software. If the cluster's memory 108 does not store the page of the remote page table containing the required RPTE, that page of the remote page table 150 will first need to be downloaded from an appropriate remotely located processor or cluster in the distributed system 100. Once the required RPTE 152 is found and the address translation into a remote physical address (RPA) is performed, then a request is transmitted via the network 114 to load a copy of the page being addressed into the requesting cluster's local memory 108.

While many of the delays associated with retrieving remotely located data are hard to avoid, the present invention provides mechanisms for speeding the translation of physical addresses into the remote physical addresses, and also for reducing the need to load pages of the remote page table 150 into local memory 108.

SUMMARY OF THE INVENTION

A computer system includes a data processor, a primary translation lookaside buffer (TLB) for storing page table entries and translating virtual addresses into physical addresses, local memory for storing data and computer programs at specified physical addresses, and remotely located memory coupled to the data processor by a computer network for storing data at specified remote physical addresses. The computer system further includes a remote translation lookaside buffer (RTLB), also called an auxiliary TLB, that stores a plurality of remote page table entries. Each remote page table entry represents a mapping between a range of physical addresses and a corresponding range of remote physical addresses. The primary translation lookaside buffer translates a virtual address asserted by the data processor into a physical address. When the physical address does not correspond to a location in local memory, the RTLB determines whether the physical address matches at least one of the remote page table entries stored in the RTLB, and selects one of those remote page table entries when at least one match is found. Then, a remote physical address is generated by combining a portion of the selected remote page table entry with a portion of the physical address.

Each remote page table entry stored in the RTLB includes address range size data indicating how large a physical address range is mapped into remote physical addresses by that remote page table entry Two or more of the remote page table entries stored in the RTLB can map overlapping physical address ranges. The RTLB's selection circuitry includes circuitry for selecting a single remote page table entry in accordance with predefined RPTE selection criteria when two or more of the remote page table entries match the physical address.

Each remote page table entry stored in the RTLB has an associated index position in the RTLB. In one embodiment, the predefined RPTE selection criteria is used to select the one of the two or more remote page table entries that match the physical address having a lowest index position in the RTLB.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
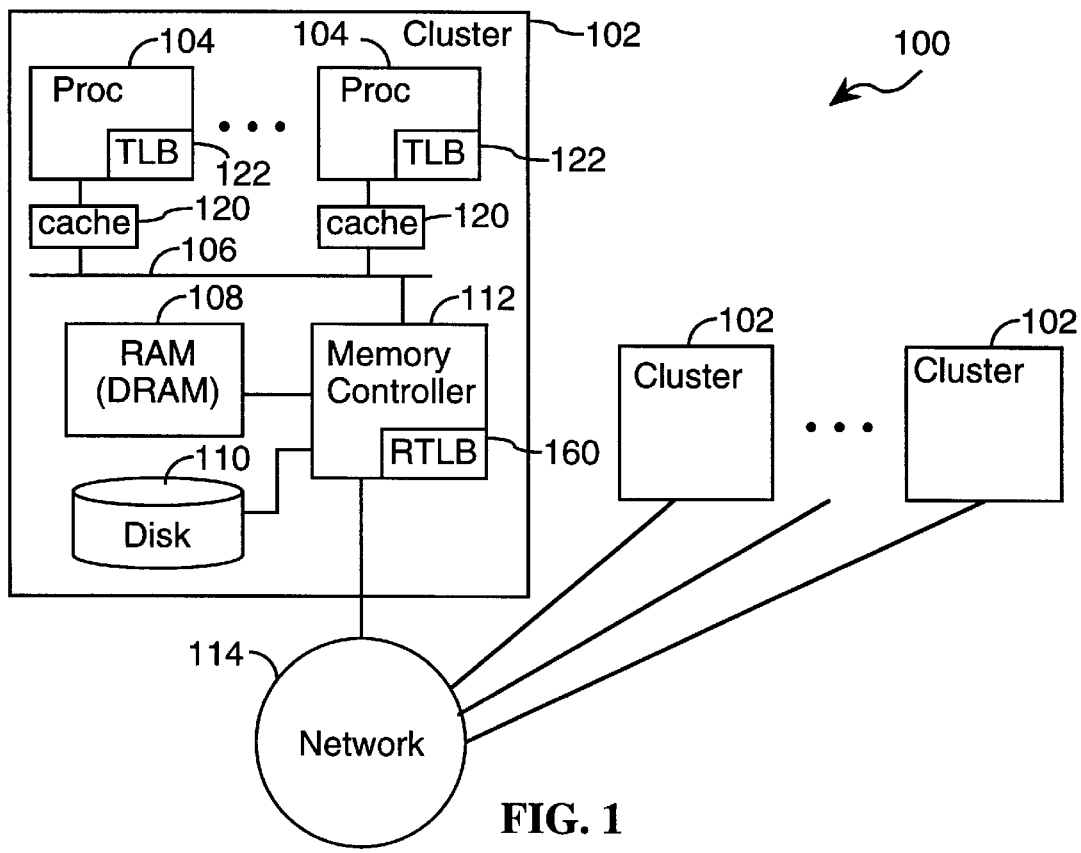
FIG. 1 is a block diagram of a distributed computer system having a number of multiprocessor clusters interconnected by a communications network.
Figure 2:
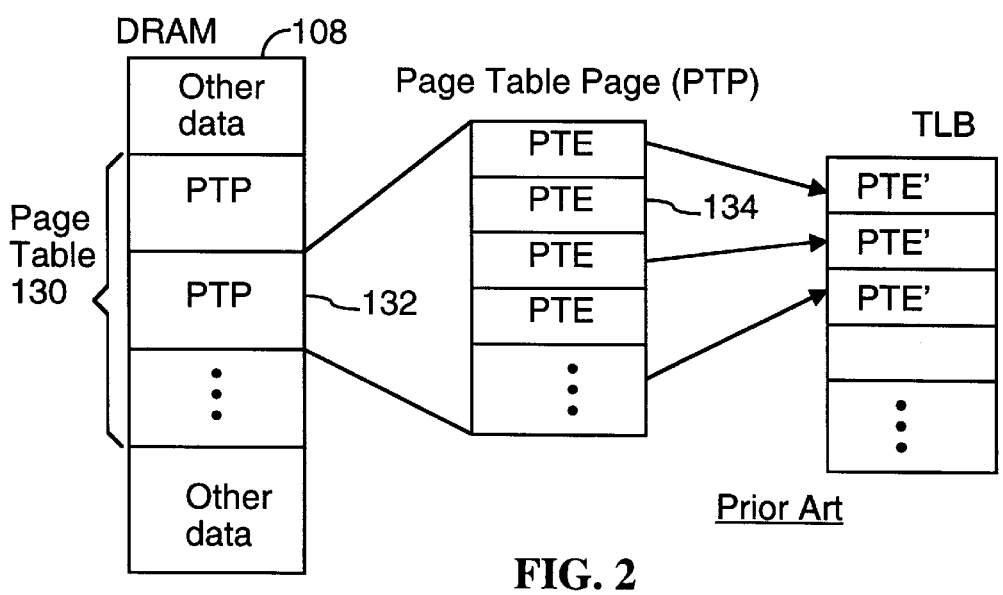
FIG. 2 depicts data structures associated with page tables for virtual memory management.
Figure 3:
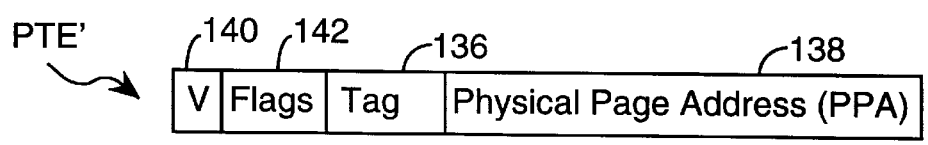
FIG. 3 depicts the structure of a page table entry.
Figure 4:
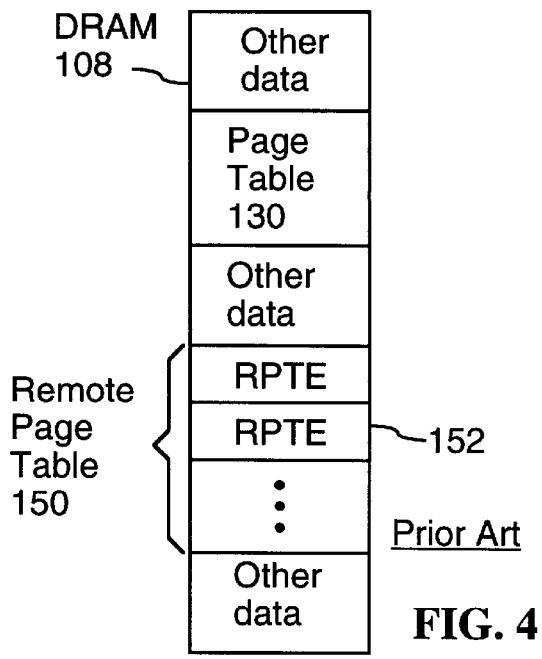
FIG. 4 depicts data structures associated with a remote page table.
Figure 5:
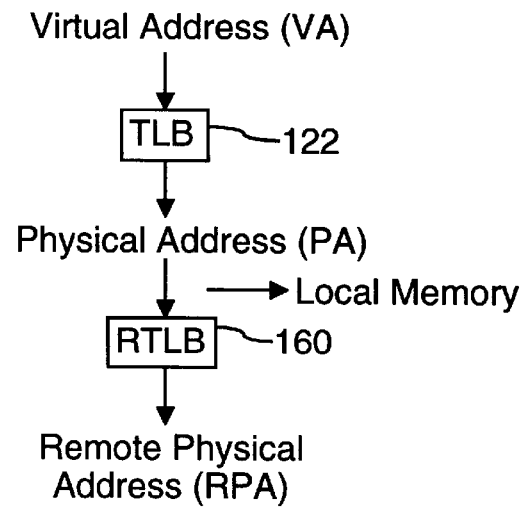
FIG. 5 schematically depicts the process by which a virtual address is translated first to a physical address, and then to a remote physical address in accordance with an embodiment of the present invention.

Referring to FIGS. 1 and 5, in accordance with the present invention, when the memory controller 112 is called upon to translate a physical address (PA) into a remote physical address (RPA), instead of having to retrieve the corresponding remote page table entry 152 from memory 108 and then convert the address using software, the present invention provides the memory controller 112 with a secondary or auxiliary TLB, herein called a cluster TLB or remote TLB (RTLB) 160. In some respects, the RTLB 160 works in much the same way as the regular TLB 122, except that its job is to store a set of remote page table entries (RPTEs) and to convert a physical address (PA) into a remote physical address (RPA) in hardware in a single processor clock cycle. The RTLB 160 speeds up the process of converting a physical address (PA) into a remote physical address (RPA) considerably both by caching RPTEs and by performing the address conversion in hardware instead of software. Of course, a physical address is converted by the RTLB into a remote physical address only if the physical address does not correspond to a location in either the local primary memory 108 or the local secondary memory 110.

Figure 6:
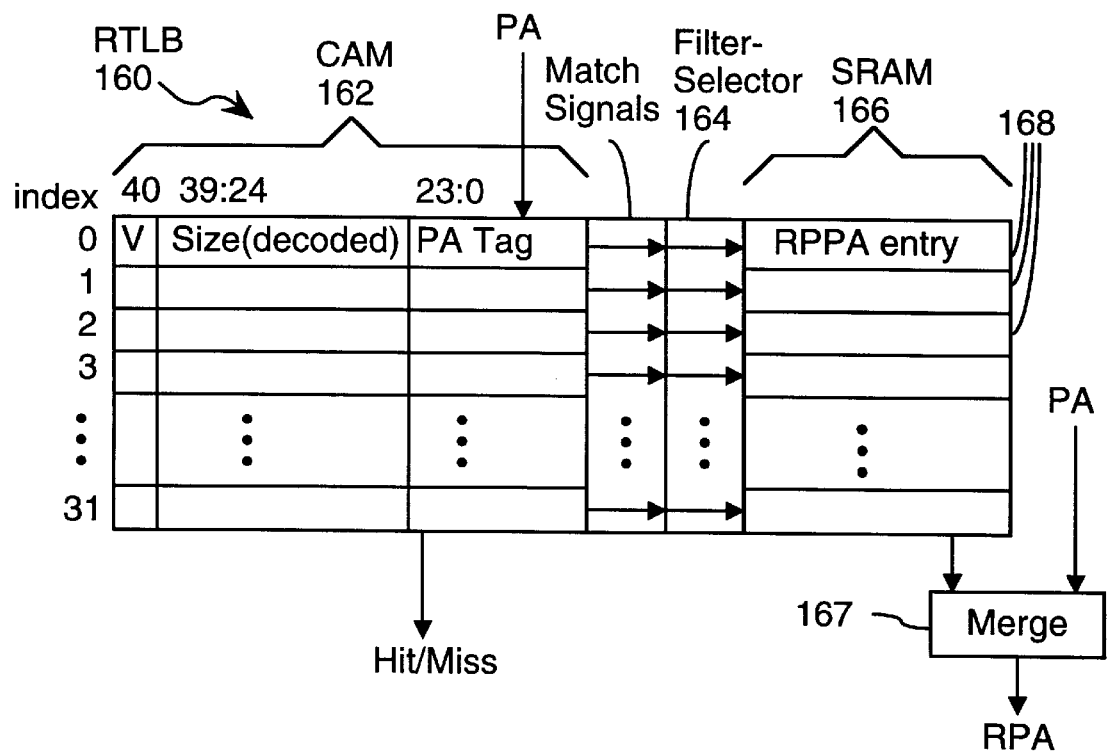
FIG. 6 depicts the structure of an embodiment of a remote lookaside translation buffer (RTLB).
Figure 7:
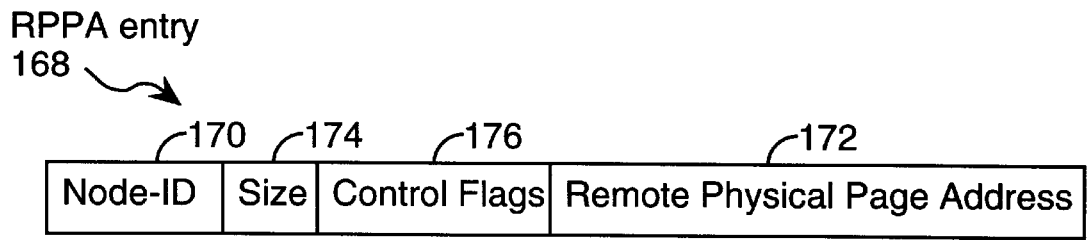
FIG. 7 depicts the structure of a remote page table entry.

Referring to FIGS. 6 and 7, the RTLB 160 includes a content addressable memory (CAM) 162, a filter-selector 164, a static random access memory (SRAM) 166, and an address bit merge circuit 167 for generating the remote physical address (RPA) output by the RTLB 160. In one embodiment of the present invention, the CAM 162 and SRAM 166 together store 32 RPTEs, with the CAM 162 storing the tag portion of each RPTE 152 and the SRAM 166 storing the remote physical address portion of each RPTE.

The RPTEs in this embodiment utilize variable address space size entries.

The size of the address space represented by each RPTE 152 is governed by the size value stored in the CAM portion of the entry. In particular, each bit of the size value masks out a corresponding bit of the PA tag. The size value is fully decoded, meaning that if the Nth bit of the size value is set equal to 1, then all of the size bits less significant than the Nth bit are also set equal to 1. For each additional bit of the size value that is set, the size of the address space represented by the RPTE is increased by an additional factor of 2. The smallest address space that can be represented by an RPTE is one page (e.g., 4 K bytes), and the largest address space that can be represented by an RPTE is 64 K pages (e.g., 256 Mbytes).

Figure 8:
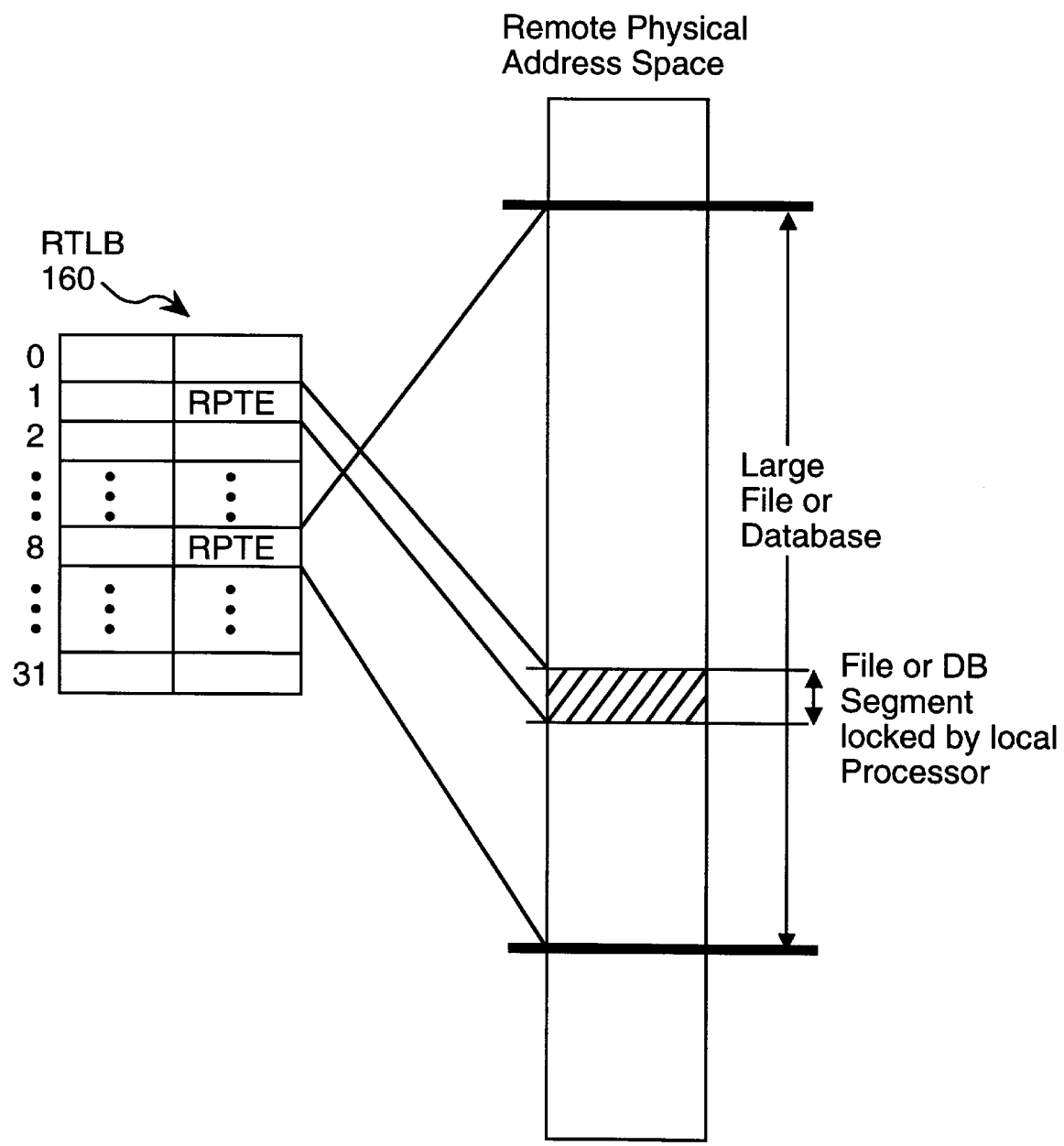
FIG. 8 depicts how overlapping entries in a remote lookaside translation buffer are utilized.

Referring to FIG. 8, the RTLB 160 of the present invention allows the entries in the RTLB to be arranged so that a specified physical address can be simultaneously matched by more than one entry. That is, simultaneously valid RPTEs in the RTLB can represent overlapping address ranges. This is directly contrary to normal TLB operation, in which all valid PTEs must represent non-overlapping address ranges. As will be explained below, the ability to have RPTEs representing overlapping address ranges is useful in a number of contexts, such as when working with very large remotely stored files and very large remotely stored databases.

The 32 entries in the RTLB are organized into four groups of eight entries (entries 0:7, 8:15, 16:23 and 24:31). While the physical address ranges of the RPTEs in any one group may overlap, it is the responsibility of the operating system 180 (see FIG. 9) to make sure that the RPTEs in different groups do not have overlapping address ranges.

As just indicated, the contents of the RTLB are controlled by the operating system 180 of the associated processors 104. That is, the operating system decides what RPTEs to store in the RTLB 160, which RPTEs to evict from the RTLB, and where to position the RPTEs within the RTLB 160. For most purposes, the operating system updates the contents of the RTLB using criteria similar to the criteria used to determine the contents of the TLB 122. However, in order to use the "overlapping address range". feature of the RTLB 160, the operating system must also include additional criteria for positioning overlapping address range entries within the same group of entries in the RTLB, and within each such group must also store the larger address range entries at higher index positions than the smaller address range entries.

In an alternate embodiment, the entire RTLB is treated as a single group of RPTEs. In this embodiment, matches in lower index positions still override matches in higher index positions, and thus the operating system must still store larger address range entries at higher index positions than the smaller address range entries.

The CAM 162 works as follows. When a physical address is presented to the RTLB 160 (which generally means that the physical address is not located in local primary or secondary memory 108 or 110), the physical address is presented simultaneously to all entries of the CAM 162. Each CAM entry 162 generates a match signal, $match_i$, whose boolean value is equal to:

$match_i = Valid_i$
&& $(Size_i(0)$ OR $\{PA_i(0)=PA(0)\})$
&& $(Size_i(1)$ OR $\{PATag_i(1)=PA(1)\})$
. . .
&& $(Size_i(15)$ OR $\{PATag_i(15)=PA(15)\})$
&& $(PATag_i(23:16)=PA(23:16))$ where && represents the logical AND operation.

In other words, a match signal equal to True is generated for a particular CAM entry if (A) the valid bit is set, and (B) all the upper address bits not masked by the Size value match the PA tag value in the CAM.

The CAM outputs a match value for each and every CAM entry, as well as a hit/miss signal that is equal to 1 if the physical address PA presented to the CAM matches at least one entry in the CAM:

Hit[0]=$match_7$ OR $match_6$ OR $match_5$ OR $match_4$ OR $match_3$ OR $match_2$ OR $match_1$ OR $match_0$ Hit[1]=$match_{15}$ OR $match_{14}$ OR $match_{13}$ OR $match_{12}$ OR $match_{11}$ OR $match_{10}$ OR $match_9$ OR $match_8$ Hit[2]=$match_{23}$ OR $match_{22}$ OR $match_{21}$ OR $match_{20}$ OR $match_{19}$ OR $match_{18}$ OR $match_{17}$ OR $match_{16}$ Hit[3]=$match_{31}$ OR $match_{30}$ OR $match_1$ OR $match_4$ OR $match_3$ OR $match_2$ OR $match_1$ OR $match_0$ Hit=HIT[3] OR Hit[2] OR Hit[1] OR Hit[0]

The four sub-hit signals correspond to the four groups of CAM entries.

The match values generated by the CAM are transmitted to a filter-selector 164. Within each of the four groups of CAM entries, the filter-selector 164 generates filtered match signals $MatchF_i$ that are all set to 0 (False) other than the lowest index match signal whose value is 1 (True). That is:

$MatchF_i$=$Match_i$ AND (no lower indexed Match value in same group is equal to 1)

where $MatchF_i$ represents the filtered match signals.

For instance, if most of a large file is stored at a first location in the system 100, but a segment of the file has been moved to a particular cluster 102 for updating, a first RPTE would be used to indicate the position of the entire file at the first location, and a second RPTE stored at a lower index position in the same group as the first RPTE would be used to indicate the position of the file segment that has been moved. If a physical address is presented to the RTLB that corresponds to the large file, but outside the moved segment, then only one match signal is generated, and that one match signal is passed by the filter-selector 164 to select a corresponding entry in the SRAM 166. If, however, a physical address is presented to the RTLB that corresponds to the moved segment of the large file, then two match signals are generated (one for the main file RPTE and one for RPTE for the moved segment). In this case the filter-selector 164 passes only one of the match signals, the one at the lower index position corresponding to the moved segment, to the SRAM. As a result, the entry in the SRAM for mapping the moved segment is activated.

The filter-selector 164 never passes more than one match signal to the SRAM 166.

The SRAM 166 portion of the RTLB 160 stores one remote physical page address (RPPA) entry 168 for each entry (RPTE) stored in the RTLB. The remote physical page address entry 168 consists of a node-ID 170, a remote physical page address 172, and a size value 174 that together indicate the location of the data being addressed by a processor. The node-ID 170 indicates the node of the system 100 at which the addressed data is stored, the remote physical page address 172 indicates the address of the page or memory block at that node where the addressed data is stored, and the size value 174 indicates the size of the memory block addressed by the remote physical page address 172.

The size value 174 also indicates how many of the least significant bits of the remote physical page address 172 must be replaced with corresponding address bits of the physical address being translated before sending out a page request to the network 114. For instance, if size value 174 were equal to 4, then the address of the remote page being addressed is generated by replacing the four least significant bits of the remote physical page address 172 with the corresponding four bits of the physical address being translated by the RTLB.

The merge circuit 167 generates either a remote physical address or a remote physical page address, depending on the requirements of the network 114, by concatenating a portion of the remote physical page address stored in the selected RPTE with a portion of the asserted physical address. The number of address bits used from the asserted physical address depends on the size of the address range mapped by the selected RPTE. When the size of the address range mapped by the selected RPTE is equal to one page, only the low order address bits of the asserted physical address are used to specify a location within the specified remotely stored page and no address bits from the asserted physical address are used to generate the remote physical page address.

As just indicated, the size value 174 is used by the merge circuit 167 to determine how many high order address bits to use from the selected RPTE and how many low order address bits to use from the asserted physical address. In particular, if S is the size value, and the page size is 4096 bytes, and the number of address bits in the remote physical page address 172 is 24, then the merge circuit 167 concatenates 24–S of the high order bits from the remote physical page address 172 with 12+S of the low order bits from the asserted physical address to generate a 36-bit remote physical address (plus a 12 bit node-ID, which is unaffected by the size value). Alternately, the merge circuit 167 concatenates 24–S of the high order bits from the remote physical page address 172 with S bits from the asserted physical address (i.e., the S bits just above the address bits used to specify a location within a page) to generate a 24-bit remote physical page address.

Each remote physical page address entry 168 also includes a set of control flags 176 that can be used to govern the mode of memory access being requested. For instance, the control flags 176 may be used to indicate "read only" access or "read/write" access to the specified remote memory block.

Figure 9:
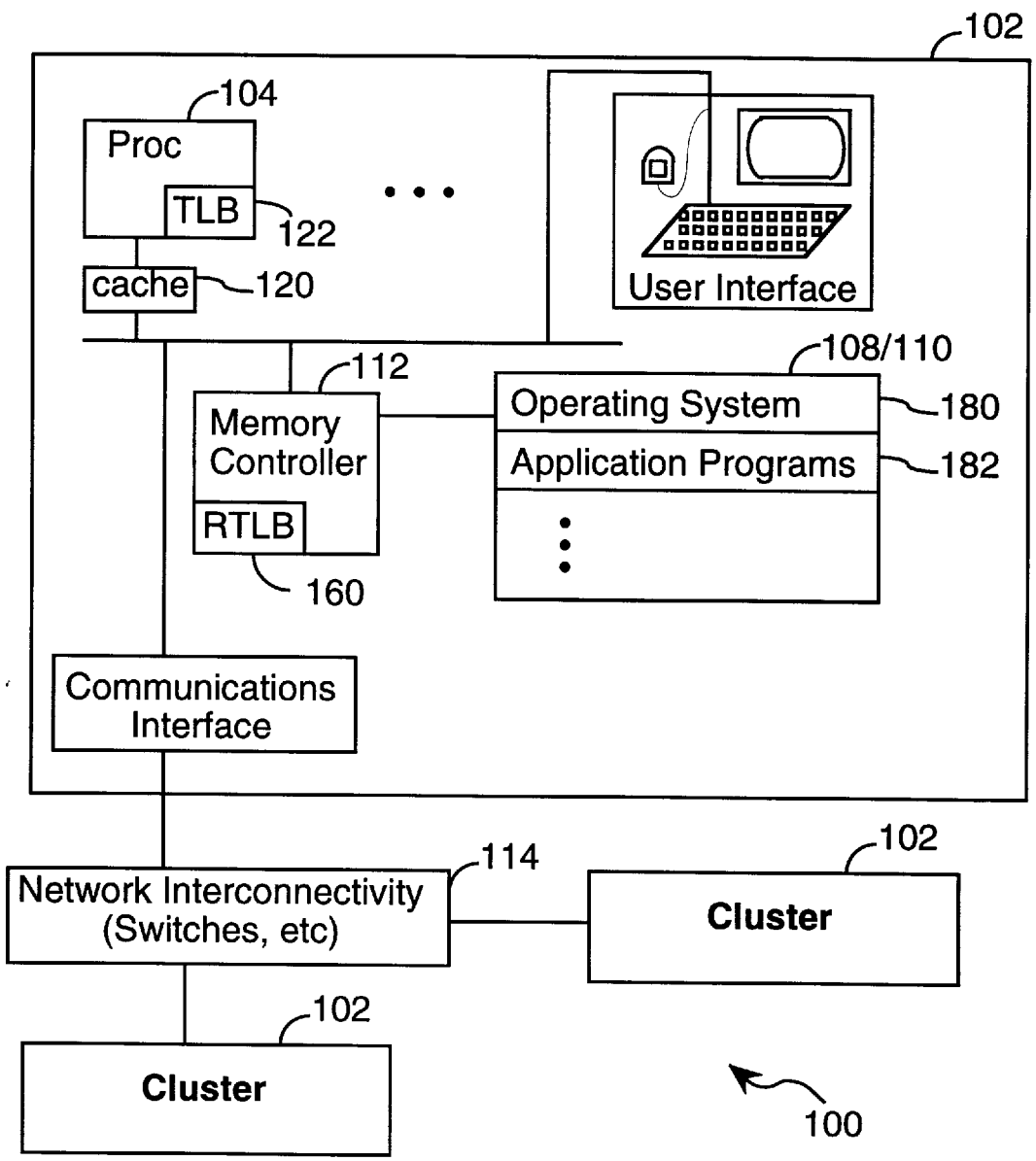
FIG. 9 is a block diagram of a one node of a distributed computer system.

Referring to FIGS. 8 and 9, when working with large files or databases, certain operating system calls (e.g., shmget() and mmap() in UNIX) can be used to set up the file in shared memory. However, such calls bring all of the file into memory, and thus even portions which are not needed are present in memory. This implies that "less memory" is available for other processes which are working on other objects and files. Moreover, in order to get the entire file into memory a number of TLB misses have to be endured. These TLB misses results in a slowdown of the operation in progress.

The present invention provides support for mapping a file, locking a portion of it in memory and then using that portion without having to lock the entire file in memory. For instance, initially the application using the large file or database can use a first call with a special "InitialMap" flag to indicate the entire file that needs to be memory mapped. Then through a second call it can open various "windows" into the file and lock those "windows" in memory for as long as it needs to work on them. This method of using the RTLB is demonstrated by the following pseudocode.

```
/*      First map the entire file, but don't lock it into memory */
MMAP (flag=INITIAL_MAP, filename=..., PA=..., RPA=address range
        of entire file)
MMAP (flag=WINDOW_MAP, PA=..., RPA=address range of first file
        portion that application needs to work on)
<Application works on the first file portion while it is locked in
        memory>
/*      Release or unlock the first file portion from memory, and then
        lock a second file portion in memory */
DEMMAP (flag=WINDOW_MAP, PA=..., RPA=address range of first
        file portion)
MMAP (flag=WINDOW_MAP, PA=..., RPA=address range of second
        file portion that application needs to work on)
<Application works on the second file portion while it is locked in
        memory>
/*      Additional file portions are locked and unlocked as application
        program requires. Finally, original TLB entry representing the
        mapping of the entire file is released. */
...
DEMMAP (flag=INITIAL_MAP, PA=..., RPA=address range of entire
        file)
```

In the above example, the remote memory mapping command MMAP and un-mapping command DEMMAP are procedures provided by the operating system 180 and that are available for use by application programs 182 when working with remote files and databases. Typically, the MMAP and DEMMAP procedure calls would be generated by other operating system procedures in response to application procedure calls requesting use of specified remote files and file portions.

In the above example, the mapping of the entire file with a first MMAP command uses an "INITIALMAP" flag, indicating that the file need not be locked in memory and that the file can be accessed on a read-only basis at a specified range of global addresses. The file portion mappings using a "WINDOWMAP" flag indicate portions of the file that need to be locked in memory so that the requesting cluster can access and modify its contents. The DEMMAP commands with the "WINDOWMAP" unlock previously locked file portions, and the DEMMAP command with the "INITIALMAP" flag eliminates the mapping between physical addresses and global addresses for the large file.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

In the embodiment described above, when two or more of the remote page table entries stored in the RTLB that map overlapping physical address ranges match an asserted physical address, the RTLB's selection circuitry selects the one of the matching remote page table entries having a lowest index position in the RTLB. In an alternate embodiment, the RTLB's selection circuitry could select the one of the matching remote page table entries having a highest index position in the RTLB. In yet other embodiments, other RPTE selection criteria could be used.

In alternate embodiments, the number of maskable address bits in the PA tag could be more or less than the 16 maskable address bits provided in the embodiment described above. By providing a larger number of maskable address bits, the size of the largest address range mappable by a single RPTE would be increased.

What is claimed is:

1. A remote translation lookaside buffer, for use in a computer system having a data processor, a primary translation lookaside buffer for storing page table entries and converting virtual addresses into local physical addresses, local memory coupled to the data processor for storing data and computer programs at specified local physical addresses, and remotely located memory coupled to the data processor by a computer network for storing data at specified remote physical addresses; the remote translation lookaside buffer comprising:

memory for storing a plurality of remote page table entries, each remote page table entry representing a mapping between a range of local physical addresses and a corresponding range of remote physical addresses; wherein each remote page table entry stored in the memory includes an address range size value indicating how large a local physical address range is mapped into remote physical addresses by that remote page table entry;

match circuitry for determining whether a first portion of an asserted local physical address matches a first portion of at least one of the remote page table entries stored in the memory;

selection circuitry, coupled to the match circuitry, for selecting one of the remote page table entries stored in the memory for which a match exists in response to an asserted local physical address; and output circuitry for generating a remote physical address by combining a second portion of the selected remote page table entry with a second portion of the asserted local physical address;

wherein the second portion of the selected remote page table entry consists of a first number of high order remote physical address bits, and the second portion of the asserted physical address consists of a second number of low order address bits of the asserted local physical address, where the first number corresponds inversely and the second number corresponds directly to the address range size value in the selected remote page table entry.

2. A remote translation lookaside buffer, for use in a computer system having a data processor, a primary translation lookaside buffer for storing page table entries and converting virtual addresses into local physical addresses, local memory coupled to the data processor for storing data and computer programs at specified local physical addresses, and remotely located memory coupled to the data processor by a computer network for storing data at specified remote physical addresses; the remote translation lookaside buffer comprising:

memory for storing a plurality of remote page table entries, each remote page table entry representing a mapping between a range of local physical addresses and a corresponding range of remote physical addresses;

match circuitry for determining whether a first portion of an asserted local physical address matches a first portion of at least one of the remote page table entries stored in the memory;

selection circuitry, coupled to the match circuitry, for selecting one of the remote page table entries stored in the memory for which a match exists in response to an asserted local physical address; and output circuitry for generating a remote physical address by combining a second portion of the selected remote page table entry with a second portion of the asserted local physical address;

wherein:

each remote page table entry stored in the memory includes address range size data indicating how large a local physical address range is mapped into remote physical addresses by that remote page table entry;

two or more of the remote page table entries stored in the memory can map overlapping local physical address ranges; and the selection circuitry includes circuitry for selecting a single one of the remote page table entries in accordance with predefined RPTE selection criteria when the match circuitry determines that two or more of the remote page table entries match the asserted local physical address.

3. The remote translation lookaside buffer of claim 2, wherein:

the remote page table entries stored in the memory each have an associated index position in the memory; and the predefined RPTE selection criteria is used to select the one of the two or more of the remote page table entries that match the asserted local physical address having a lowest index position in the memory.

4. The remote translation lookaside buffer of claim 2, wherein:

the remote page table entries stored in the memory each have an associated index position in the memory; and the predefined RPTE selection criteria is used to select the one of the two or more of the remote page table entries that match the asserted local physical address having a highest index position in the memory.

5. A computer system that is coupled to a remotely located memory by a computer network for storing data at specified remote physical addresses; the computer system comprising:

a data processor, including a primary translation lookaside buffer for storing page table entries and converting virtual addresses into local physical addresses;

local memory coupled to the data processor for storing data and computer programs at specified local physical addresses; and a memory controller for managing access to the local memory and the remotely located memory, the memory controller including a remote translation lookaside buffer;

the remote translation lookaside buffer including:

RPTE (remote page table entry) memory for storing a plurality of remote page table entries, each remote page table entry representing a mapping between a range of local physical addresses and a corresponding range of remote physical addresses; wherein each remote page table entry stored in the RPTE memory includes an address range size value indicating how large a local physical address range is mapped into remote physical addresses by that remote page table entry;

match circuitry for determining whether a first portion of an asserted local physical address matches a first portion of at least one of the remote page table entries stored in the RPTE memory;

selection circuitry, coupled to the match circuitry, for selecting one of the remote page table entries stored in the RPTE memory for which a match exists in response to an asserted local physical address; and output circuitry for generating a remote physical address by combining a second portion of the selected remote page table entry with a second portion of the asserted physical address;

wherein the second portion of the selected remote page table entry consists of a first number of high order remote physical address bits, and the second portion of the asserted physical address consists of a second number of low order address bits of the asserted local physical address, where the first number corresponds inversely and the second number corresponds directly to the address range size value in the selected remote page table entry.

6. A computer system that is coupled to a remotely located memory by a computer network for storing data at specified remote physical addresses; the computer system comprising:

a data processor, including a primary translation lookaside buffer for storing page table entries and converting virtual addresses into local physical addresses;

local memory coupled to the data processor for storing data and computer programs at specified local physical addresses; and a memory controller for managing access to the local memory and the remotely located memory, the memory controller including a remote translation lookaside buffer;

the remote translation lookaside buffer including:

RPTE (remote page table entry) memory for storing a plurality of remote page table entries, each remote page table entry representing a mapping between a range of local physical addresses and a corresponding range of remote physical addresses;

match circuitry for determining whether a first portion of an asserted local physical address matches a first portion of at least one of the remote page table entries stored in the RPTE memory;

selection circuitry, coupled to the match circuitry, for selecting one of the remote page table entries stored in the RPTE memory for which a match exists in response to an asserted local physical address; and output circuitry for generating a remote physical address by combining a second portion of the selected remote page table entry with a second portion of the asserted physical address;

wherein:

each remote page table entry stored in said RPTE memory includes address range size data indicating how large a local physical address range is mapped into remote physical addresses by that remote page table entry;

two or more of the remote page table entries stored in the RPTE memory can map overlapping local physical address ranges; and the selection circuitry includes circuitry for selecting a single one of the remote page table entries in accordance with predefined RPTE selection criteria when the match circuitry determines that two or more of the remote page table entries match the asserted local physical address.

7. The computer system of claim 6, wherein:

the remote page table entries stored in the RPTE memory each have an associated index position in the RPTE memory; and the predefined RPTE selection criteria is used to select the one of the two or more of the remote page table entries that match the asserted local physical address having a lowest index position in the RPTE memory.

8. The computer system of claim 6, wherein:

the remote page table entries stored in the RPTE memory each have an associated index position in the RPTE memory; and the predefined RPTE selection criteria is used to select the one of the two or more of the remote page table entries that match the asserted local physical address having a highest index position in the RPTE memory.

9. A method of operating a computer system having a data processor, a primary translation lookaside buffer for storing page table entries and translating virtual addresses into local physical addresses, local memory coupled to the data processor for storing data and computer programs at specified local physical addresses, and remotely located memory coupled to the data processor by a computer network for storing data at specified remote physical addresses; the steps of the method comprising:

storing in a remote translation lookaside buffer (RTLB) a plurality of remote page table entries, each remote page table entry representing a mapping between a range of local physical addresses and a corresponding range of remote physical addresses; wherein each remote page table entry stored in the RTLB includes an address range size value indicating how large a local physical address range is mapped into remote physical addresses by that remote page table entry;

translating, using the primary translation lookaside buffer, a virtual address asserted by the data processor into a local physical address;

when the local physical address does not correspond to a location in the local memory, determining whether a first portion of the local physical address matches a first portion of at least one of the remote page table entries stored in the RTLB;

selecting one of the remote page table entries stored in the RTLB for which a match exists; and generating a remote physical address by combining a second portion of the selected remote page table entry with a second portion of the physical address;

wherein the second portion of the selected remote page table entry consists of a first number of high order remote physical address bits, and the second portion of the asserted physical address consists of a second number of low order address bits of the asserted local physical address, where the first number corresponds inversely and the second number corresponds directly to the address range size value in the selected remote page table entry.

10. A method of operating a computer system having a data processor, a primary translation lookaside buffer for storing page table entries and translating virtual addresses into local physical addresses, local memory coupled to the data processor for storing data and computer programs at specified local physical addresses, and remotely located memory coupled to the data processor by a computer network for storing data at specified remote physical addresses; the steps of the method comprising:

storing in a remote translation lookaside buffer (RTLB) a plurality of remote page table entries, each remote page table entry representing a mapping between a range of local physical addresses and a corresponding range of remote physical addresses;

translating, using the primary translation lookaside buffer, a virtual address asserted by the data processor into a local physical address;

when the local physical address does not correspond to a location in the local memory, determining whether a first portion of the local physical address matches a first portion of at least one of the remote page table entries stored in the RTLB;

selecting one of the remote page table entries stored in the RTLB for which a match exists; and generating a remote physical address by combining a second portion of the selected remote page table entry with a second portion of the physical address;

wherein:

each remote page table entry stored in the RTLB includes address range size data indicating how large a local physical address range is mapped into remote physical addresses by that remote page table entry;

two or more of the remote page table entries stored in the RTLB can map overlapping local physical address ranges; and the selection circuitry includes circuitry for selecting a single one of the remote page table entries in accordance with predefined RPTE selection criteria when the match determining step determines that two or more of the remote page table entries match the local physical address.

11. The method of claim 10, wherein:

the remote page table entries stored in the RTLB each have an associated index position in the RTLB; and the predefined RPTE selection criteria is used to select the one of the two or more of the remote page table entries that match the local physical address having a lowest index position in the RTLB.

12. The method of claim 10, wherein:

the remote page table entries stored in the RTLB each have an associated index position in the RTLB; and the predefined RPTE selection criteria is used to select the one of the two or more of the remote page table entries that match the local physical address having a highest index position in the RTLB.

* * * * *